United States Patent
Burchett et al.

(10) Patent No.: US 9,734,137 B2
(45) Date of Patent: Aug. 15, 2017

(54) SECURE THIRD-PARTY DOCUMENT EDITING

(71) Applicant: Dell Products, L.P., Round Rock, TX (US)

(72) Inventors: Christopher Duane Burchett, Lewisville, TX (US); James Michael Burke, Frisco, TX (US); David Konetski, Austin, TX (US); James Darrell Testerman, McKinney, TX (US)

(73) Assignee: Dell Products, L.P., Round Rock, TX (US)

( * ) Notice: Subject to any disclaimer, the term of this patent is extended or adjusted under 35 U.S.C. 154(b) by 52 days.

(21) Appl. No.: 14/922,525

(22) Filed: Oct. 26, 2015

(65) Prior Publication Data

US 2017/0116166 A1  Apr. 27, 2017

(51) Int. Cl.
| | | |
|---|---|---|
| H04L 29/06 | (2006.01) | |
| G06F 17/24 | (2006.01) | |
| G06F 17/21 | (2006.01) | |
| G06F 3/0484 | (2013.01) | |
| G06F 17/27 | (2006.01) | |
| G06F 3/0481 | (2013.01) | |

(52) U.S. Cl.
CPC ............ *G06F 17/24* (2013.01); *G06F 3/0481* (2013.01); *G06F 3/04842* (2013.01); *G06F 17/211* (2013.01); *G06F 17/277* (2013.01); *H04L 63/0428* (2013.01)

(58) Field of Classification Search
CPC .... G06F 17/24; G06F 3/0481; G06F 3/04842; G06F 17/211; G06F 17/277; H04L 63/0428
USPC ......................................... 713/168
See application file for complete search history.

(56) References Cited

U.S. PATENT DOCUMENTS

| | | | |
|---|---|---|---|
| 2014/0278508 A1* | 9/2014 | Akdogan ........... | B65D 83/0409 705/2 |
| 2015/0324592 A1* | 11/2015 | Dutta .................... | G06F 21/602 713/165 |
| 2015/0379294 A1* | 12/2015 | Cohen .................... | G06F 17/24 726/28 |

* cited by examiner

*Primary Examiner* — Michael S McNally
(74) *Attorney, Agent, or Firm* — Fogarty LLP

(57) ABSTRACT

Systems and methods for secure third-party document editing are described. In some embodiments, a method may include tokenizing a file retrieved from a cloud storage provider (CSP); transmitting the tokenized file to a cloud editing provider (CEP); receiving a modified, tokenized file from the CEP; de-tokenizing the modified file; and enabling rendering of the de-tokenized, modified file. In other embodiments, a memory device may have program instructions stored thereon that, upon execution by a processor of an Information Handling System (IHS), cause the IHS to: provide a portal to a user executing a browser on a client device, wherein the portal includes an interface to a CSP and to a cloud editing provider (CDEP); and allow the user to access a document stored in the CSP and to edit the document using the CDEP via the browser.

19 Claims, 2 Drawing Sheets

SECURE THIRD-PARTY DOCUMENT EDITING

FIELD

This disclosure relates generally to computer systems, and more specifically, to systems and methods for secure third-party document editing.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Cloud computing is a model for enabling access to a shared pool of computing resources. Particularly, cloud computing and cloud storage solutions provide users and enterprises with various capabilities to store and process their data in third-party IHSs and data centers. The approach relies on sharing of resources to achieve coherence and economies of scale, for example, by reducing the overall cost of resources, such as: power, air conditioning, rack space, etc. needed to maintain a given system. Also, with cloud computing, multiple users can often access a remote server to retrieve and update their data without purchasing software licenses for different applications.

Although enterprise data owners may desire to deploy cloud services (such as, for example, MICROSOFT OFFICE 365, EVERNOTE, GOOGLE DOCS, and others) to their users, they also have a fiduciary and corporate responsibility to maintain the security of sensitive data.

However, when using conventional cloud services, data is stored in plaintext in the cloud provider, resulting in the data owner losing control of private documents, which may be subject to disclosure through theft, catastrophic system failures, court subpoena, etc. The inventors hereof have determined that these problems are the main reason why businesses continue to resist using cloud services altogether; or limit their use within the enterprise.

SUMMARY

Embodiments of systems and methods for secure third-party document editing are described herein. In an illustrative, non-limiting embodiment, a method may include: tokenizing a file retrieved from a cloud storage provider (CSP); transmitting the tokenized file to a cloud editing provider (CEP); receiving a modified, tokenized file from the CEP; de-tokenizing the modified file; and enabling rendering of the de-tokenized, modified file.

The file retrieved from the CSP may be encrypted, and the method may further comprise decrypting the encrypted file using a key identification stored in a file header. For example, the file may include an electronic document. The file may include a raw data component and a formatting component, and tokenizing the file may include tokenizing the raw data component but not the formatting component.

In some cases, tokenizing the file may include employing a one-time pad technique. Additionally or alternatively, tokenizing the file may include creating a tokenization seed and a stream of token values. Additionally or alternatively, tokenizing the file may include replacing the raw data component with the stream of token values.

The modified, tokenized file received from the CEP may include one or more modifications to the raw data component, and the modifications may be performed by a user. Meanwhile, de-tokenizing the file may include using the tokenization seed to de-tokenize the modified raw data component.

In another illustrative, non-limiting embodiment, a memory device may have program instructions stored thereon that, upon execution by a processor of an IHS, cause the IHS to: provide a portal to a user executing a browser on a client device, wherein the portal includes an interface to a CSP and to a cloud document editing provider (CDEP); and allow the user to access a document stored in the CSP and to edit the document using the CDEP via the browser, wherein the document includes a plaintext portion and a formatting portion, and wherein the editing occurs without transmitting the plaintext portion to the CDEP.

The program instructions, upon execution, may also cause the IHS to: allow the user to select the document using the browser; retrieve the document from the CSP; and provide the document to the client device, wherein the browser is configured to render the document and to allow the user to edit the document via the portal. The program instructions, upon execution, may further cause the IHS to: tokenize the document; and transmit the tokenized document to the CDEP.

In various implementations, tokenizing the file may include tokenizing the plaintext portion but not the formatting portion. Tokenizing the file may also include creating a tokenization seed and a stream of token values and replacing the plaintext portion with the stream of token values.

The program instructions, upon execution, may also cause the IHS to: receive an edit from a user manipulating the document in the browser; transmit a tokenized version of the edit to the CDEP; and receive a modified, tokenized document from the CDEP. The program instructions, upon execution, may further cause the IHS to: de-tokenize the modified document; and provide the de-tokenized, modified document to the client device, wherein the browser is configured to render the de-tokenized, modified document.

In yet another illustrative, non-limiting embodiment, an IHS may include: a processor; and a memory coupled to the processor, the memory having program instructions stored thereon that, upon execution by the processor, cause the IHS to: provide a portal to a user executing a browser on a client device, wherein the portal includes an interface to a CSP and to a CDEP; allow the user to select a document using the browser; retrieve the document from the CSP; provide the document to the client device, wherein the browser is configured to render the document and to allow the user to edit the document via the portal; tokenize the document; transmit the tokenized document to the CDEP; receive an edit from a user manipulating the document in the browser; transmit a tokenized version of the edit to the CDEP; receive a modified, tokenized document from the CDEP; de-tokenize the modified document; and provide the de-tokenized, modified document to the client device, wherein the browser is configured to render the de-tokenized, modified document.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
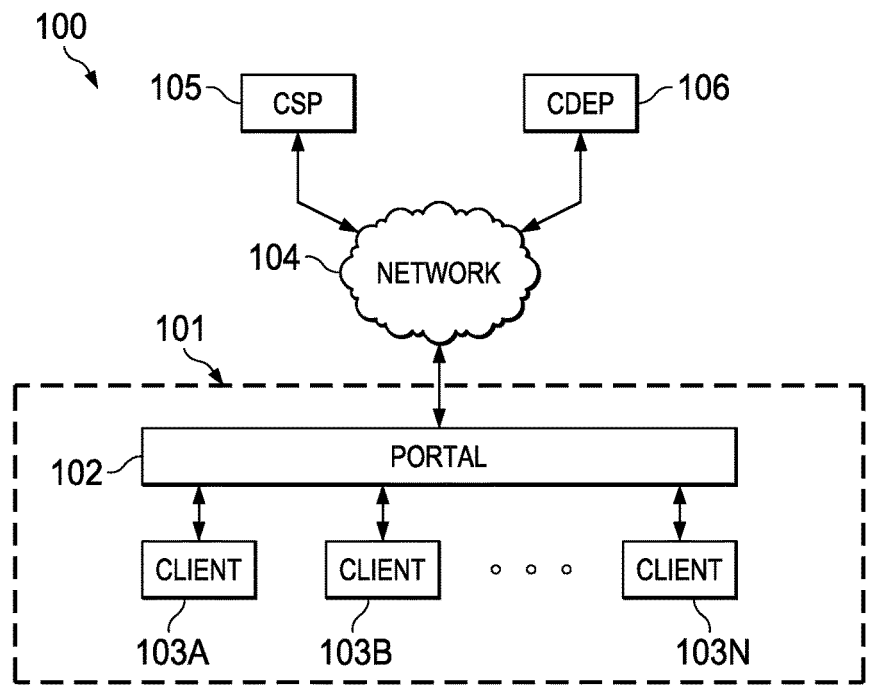
FIG. 1 is a block diagram of an example of a system for secure third-party document editing according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail in FIG. 3.

As described above, when using conventional cloud services, data is stored in plaintext in the cloud provider, resulting in the data owner losing control of private documents and other electronic files. To address these, and other problems, systems and methods described herein may provide a secure web service that embeds third-party, public Cloud Document Editing Providers (CDEPs) such as, for example, OFFICE365, in a website that is run on-premise by the enterprise data owner and ensures that plaintext or raw data is not sent to the CDEP. In cases where the electronic file is not a text document (e.g., an image, audio, movie, etc.), CDEPs may be referred to simply as Cloud Editing Providers or (CEPs).

The secure data lifecycle is embodied by starting with the ability to encrypt data to be stored in public Cloud Storage Providers (CSPs) such as, for example, DROPBOX, MICROSOFT ONE DRIVE FOR BUSINESS, GOOGLE DRIVE, BOX.COM, EVERNOTE, etc.; retrieve and decrypt the data via an on-premise portal, tokenize the data in preparation for transmission to CDEP, who renders the data and facilitates editing, without having access to the encryption key or fully decrypted data. The portal website may also be responsible for displaying the data, and will intercept the tokenized contents, convert the tokenized data to plaintext or raw data and display it to the user.

In various embodiments, systems and methods described herein may enable users to access any third-party web document editor or service without disclosing confidential information to these services. This is achieved, at least in part, by sending the document editor or service a tokenized version of the document's contents, which are subsequently detokenized in the user's browser.

FIG. 1 is a block diagram of an example of system 100 for secure third-party document editing according to some embodiments. Particularly, enterprise 101 includes productivity portal 102 (e.g., an IHS implemented as a server) and a plurality of clients 103A-N. Enterprise 101 has access to the Internet, for example, through telecommunications network 104. In some cases, one or more of clients 103A-N may be disposed outside of enterprise 101 and may access portal 102 via network 104.

In several embodiments, telecommunications network 104 may include one or more wireless networks, circuit-switched networks, packet-switched networks, or any combination thereof to enable communications between two or more IHSs. For example, network 104 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

Figure 2:
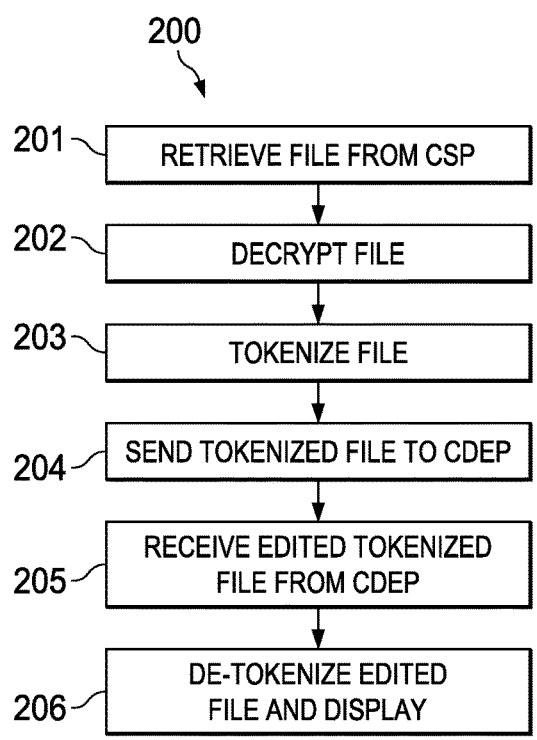
FIG. 2 is a block diagram of an example of a method for secure third-party document editing according to some embodiments.

In operation, enterprise 101 may provide users 103A-N with managed or controlled access to CSP 105 and/or CDEP 106 through portal 102. To this end, portal 102 may be configured to perform a number of operations described in more detail with respect to FIG. 2.

Assume, for sake of illustration, that a sensitive document has been encrypted by a user on a client system 103A-N, and the encrypted form of the document is stored in CSP 105. The user then wishes to edit the document in his or her client device's web browser using services from CDEP 106, and navigates to their on-premise productivity portal 102 where they open the document for editing. In various embodiments, productivity portal 102 may utilize an embeddable form of a document editing application as a data editing and rendering proxy to CDEP 106.

At block 201 and in response to the aforementioned actions, productivity portal 102 retrieves the indicated file from CSP 105. At block 202, portal 102 examines the document header to retrieve an encryption key ID and, using the key ID and user ID, queries a key server (not shown) to retrieve the key, if allowed. Using the retrieved encryption key, portal 102 decrypts the file. In some embodiments, the decrypted file's contents may be a combination of EXtensible Markup Language (XML) file structure, with formatting and rendering information, and raw content information (e.g., plaintext, etc.).

At block 203, portal 102 creates a tokenization seed (a value used to create a series of pseudo random token values) and stream of token values. Then, portal 102 transforms the decrypted file content information using the token stream into a tokenized form that is compatible with XML, JAVASCRIPT, JSON or the like.

In some cases, a tokenization transform may be combined with one-time pad techniques to generate higher resilience against crypto-analytic attacks. Portal 102 combines the transformed (that is, tokenized) file contents with the decrypted XML file structure, formatting and rendering information into a new file to be edited and rendered by the embedded document editing component (e.g., OFFICE365 or the like).

At block 204, portal 102 sends the file to be edited and rendered to CDEP 106. Portal 102 also sends the tokenization seed to a browser plugin in the user's client device so the rendered information can be de-tokenized by the browser. Portal 102 also transmits the rendered data from the embedded document editing component to the client's browser.

As the user works on the document, he or she may make edits to the content or formatting of the document. These modifications to the document are also tokenized and sent to CDEP 106. At block 205, portal 102 may receive an edited tokenized file from CDEP 106.

At block 206, a portal browser plugin (or JAVASCRIPT, for instance) may perform the following to de-tokenize and display the full data: it may create a stream of token values using the tokenization seed, use the tokenization values to transform the tokenized file content into the original un-tokenized file content, and display the resulting original content to the user in the browser window.

Accordingly, in various embodiments, on-premise website 102 may provide the following capabilities: a method to authenticate the user and dynamically retrieve encryption keys, a method to read the encrypted data from the CSPs and decrypt the data into a plaintext document or file that can be rendered by the third-party in the context of the on-premise web service, a method to tokenize the plaintext data in a way that is compatible with JAVASCRIPT, XML, and JSON, a method to replace plaintext data with tokenized data in the decrypted document to form a new tokenized document, a method to cache and associate plaintext data with tokenized data, a method to send the tokenized document to the CDEP for rendering, a method to recognize the tokenized data when the CDEP renders the tokenized document, and a method to replace the recognized tokenized data rendered by the CDRP with actual plaintext data Some implementations may replace tokenization with encryption using a one-time pad known only to the secure web service. Also, in at least one implementation, the secure web service may be run by a trusted third-party in a setting such as private cloud or security managed service. Particularly, a "third-party security as a service" offering may be especially suitable to small and medium-sized businesses who may not wish public cloud providers to have both the data and the encryption keys, but may be more comfortable with a trusted third-party provider to run a secure web service on their behalf. In such an implementation, the actual de-tokenization may occur in the browser itself to avoid the trusted third-party from having access to the data.

It should be noted that tokenization systems for the cloud exist today, but are typically implemented in a reverse proxy method. In contrast, the systems and methods described herein provide alternative implementation approaches that enable third-party CDEP's to plug in to a secure web service instead of requiring that portal 102 support each individual third-party CDEP that a given user may ask for.

In some cases, the CDEP or CEP may also be used for viewers that do not provide any editing capabilities. For example, the user may be operating an HTML5 web viewer, and the enterprise owner may still want to prevent the service that provides the viewer or editor from seeing plaintext content.

Figure 3:
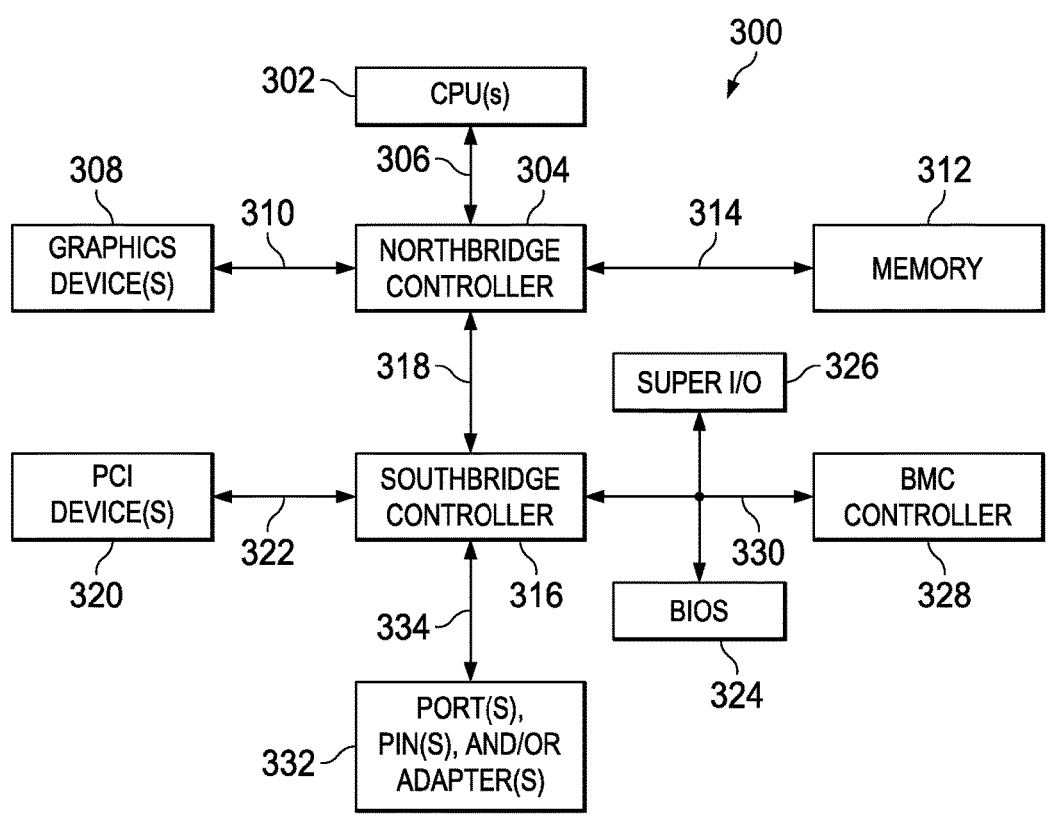
FIG. 3 is a block diagram of an example of an Information Handling System (IHS) configured to implement systems and methods described herein according to some embodiments.

FIG. 3 is a block diagram an example of IHS 300 which may be used to implement a system for secure third-party document editing. In various embodiments, IHS or computing device 300 may be used to implement any of the blocks shown in FIG. 1. In that regard, computing device 300 includes one or more CPUs 302. For example, computing device 300 may be a single-processor system including one CPU 302, or a multi-processor system including two or more CPUs 302 (e.g., two, four, eight, or any other suitable number). CPU(s) 302 may include any processor capable of executing program instructions.

In various embodiments, CPU(s) 302 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 302 may commonly, but not necessarily, implement the same ISA. In an embodiment, a motherboard (not shown) may be configured to provide structural support, power, and electrical connectivity between these various components.

CPU(s) 302 are coupled to northbridge controller or chipset 304 via front-side bus 306. Northbridge controller 304 may be configured to coordinate I/O traffic between CPU(s) 302 and other components. For example, in this particular implementation, northbridge controller 304 is coupled to graphics device(s) 308 (e.g., one or more video cards or adaptors, etc.) via graphics bus 310 (e.g., an Accelerated Graphics Port or AGP bus, a Peripheral Component Interconnect or PCI bus, etc.). Northbridge controller 304 is also coupled to system memory 312 via memory bus 314. Memory 312 may be configured to store program instructions and/or data accessible by CPU(s) 302. In various embodiments, memory 312 may be implemented using any suitable memory technology, such as static RAM (SRAM), synchronous dynamic RAM (SDRAM), nonvolatile/Flash-type memory, or any other type of memory.

Northbridge controller 304 is coupled to southbridge controller or chipset 316 via internal bus 318. Generally, southbridge controller 316 may be configured to handle various of computing device 300's I/O operations, and it may provide interfaces such as, for instance, Universal Serial Bus (USB), audio, serial, parallel, Ethernet, etc., via port(s), pin(s), and/or adapter(s) 332 over bus 334. For example, southbridge controller 316 may be configured to allow data to be exchanged between computing device 300 and other devices, such as other IHSs attached to a network. In various embodiments, southbridge controller 316 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 316 may also enable connection to one or more keyboards, keypads, touch screens, scanning devices, voice or optical recognition devices, or any other devices suitable for entering or retrieving data. Multiple I/O devices may be present in computing device 300. In some embodiments, I/O devices may be separate from computing device 300 and may interact with computing device 300 through a wired or wireless connection. As shown, southbridge controller 316 is further coupled to one or more PCI devices 320 (e.g., modems, network cards, sound cards, video cards, etc.) via PCI bus 322. Southbridge controller 316 is also coupled to Basic I/O System (BIOS) 324, Super I/O Controller 326, and Baseboard Management Controller (BMC) 328 via Low Pin Count (LPC) bus 330.

BIOS 324 includes non-volatile memory having program instructions stored thereon. Those instructions may be usable CPU(s) 302 to initialize and test other hardware components and/or to load an Operating System (OS) onto computing device 300. As such, BIOS 324 may include a firmware interface that allows CPU(s) 302 to load and execute certain firmware, as described in more detail below. In some cases, such firmware may include program code that is compatible with the Unified Extensible Firmware Interface (UEFI) specification, although other types of firmware may be used.

BMC controller 328 may include non-volatile memory having program instructions stored thereon that are usable by CPU(s) 302 to enable remote management of computing device 300. For example, BMC controller 328 may enable a user to discover, configure, and manage BMC controller 328, setup configuration options, resolve and administer hardware or software problems, etc. Additionally or alternatively, BMC controller 328 may include one or more firmware volumes, each volume having one or more firmware files used by the BIOS' firmware interface to initialize and test components of computing device 300.

Super I/O Controller 326 combines interfaces for a variety of lower bandwidth or low data rate devices. Those devices may include, for example, floppy disks, parallel ports, keyboard and mouse, temperature sensor and fan speed monitoring, etc.

In some cases, computing device 300 may be configured to access different types of computer-accessible media separate from memory 312. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 300 via northbridge controller 304 and/or southbridge controller 316.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 304 may be combined with southbridge controller 316, and/or be at least partially incorporated into CPU(s) 302. In other implementations, one or more of the devices or components shown in FIG. 3 may be absent, or one or more other components may be added. Accordingly, systems and methods described herein may be implemented or executed with other computer system configurations.

A person of ordinary skill will recognize that computer system 300 of FIG. 3 is only one example of a system in which the present embodiments may be utilized. Indeed, the present embodiments may be used in various electronic devices, such as network router devices, televisions, custom telecommunications equipment for special-purpose use, etc. The present embodiments are in no way limited to use with the IHS of FIG. 3.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. In an Information Handling System (IHS), a method comprising:
   retrieving an encrypted file from a cloud storage provider (CSP);

decrypting the encrypted file using a key identification stored in a file header;
tokenizing the decrypted file;
transmitting the tokenized file to a cloud editing provider (CEP);
receiving a modified, tokenized file from the CEP;
de-tokenizing the modified file;
enabling rendering of the de-tokenized, modified file.

2. The method of claim 1, wherein the file includes an electronic document.

3. The method of claim 1, wherein the file includes a raw data component and a formatting component, and wherein tokenizing the file includes tokenizing the raw data component but not the formatting component.

4. The method of claim 3, wherein tokenizing the file includes employing a one-time pad technique.

5. The method of claim 3, wherein tokenizing the file includes creating a tokenization seed and a stream of token values.

6. The method of claim 5, wherein tokenizing the file includes replacing the raw data component with the stream of token values.

7. The method of claim 6, wherein the modified, tokenized file received from the CEP includes one or more modifications to the raw data component, and wherein the modifications are performed by a user.

8. The method of claim 7, wherein de-tokenizing the file includes using the tokenization seed to de-tokenize the modified raw data component.

9. A hardware memory device having program instructions stored thereon that, upon execution by a processor of an Information Handling System (IHS), cause the IHS to:
provide a portal to a user executing a browser on a client device, wherein the portal includes an interface to a cloud storage provider (CSP) and to a cloud document editing provider (CDEP);
allow the user to access a document stored in the CSP and to edit the document using the CDEP via the browser, wherein the document includes a plaintext portion and a formatting portion, and wherein the editing occurs without transmitting the plaintext portion to the CDEP;
allow the user to select the document using the browser;
retrieve the document from the CSP;
provide the document to the client device, wherein the browser is configured to render the document and to allow the user to edit the document via the portal
tokenize the document;
transmit the tokenized document to the CDEP;
receive an edit from a user manipulating the document in the browser;
transmit a tokenized version of the edit to the CDEP; and
receive a modified, tokenized document from the CDEP.

10. The hardware memory device of claim 9, wherein tokenizing the file includes tokenizing the plaintext portion but not the formatting portion.

11. The hardware memory device of claim 10, wherein tokenizing the file includes creating a tokenization seed and a stream of token values and replacing the plaintext portion with the stream of token values.

12. The hardware memory device of claim 9, wherein the program instructions, upon execution, further cause the IHS to:
de-tokenize the modified document; and
provide the de-tokenized, modified document to the client device, wherein the browser is configured to render the de-tokenized, modified document.

13. An Information Handling System (IHS), comprising:
a processor; and
a memory coupled to the processor, the memory having program instructions stored thereon that, upon execution by the processor, cause the IHS to:
provide a portal to a user executing a browser on a client device, wherein the portal includes an interface to a cloud storage provider (CSP) and to a cloud document editing provider (CDEP);
allow the user to select a document using the browser;
retrieve the document from the CSP;
provide the document to the client device, wherein the browser is configured to render the document and to allow the user to edit the document via the portal;
tokenize the document, wherein tokenizing the document includes tokenizing a plaintext portion but not a formatting portion;
transmit the tokenized document to the CDEP;
receive an edit from a user manipulating the document in the browser; transmit a tokenized version of the edit to the CDEP; receive a modified, tokenized document from the CDEP;
de-tokenize the modified document; and
provide the de-tokenized, modified document to the client device, wherein the browser is configured to render the de-tokenized, modified document.

14. The IHS of claim 13, wherein tokenizing the document further includes creating a tokenization seed and a stream of token values.

15. The IHS of claim 14, wherein the program instructions, upon execution by the processor, further cause the IHS to replace the plaintext portion with the stream of token values.

16. In an Information Handling System (IHS), a method comprising:
tokenizing a file retrieved from a cloud storage provider (CSP), wherein the file includes a raw data component and a formatting component, and wherein tokenizing the file includes tokenizing the raw data component but not the formatting component;
transmitting the tokenized file to a cloud editing provider (CEP);
receiving a modified, tokenized file from the CEP;
de-tokenizing the modified file; and
enabling rendering of the de-tokenized, modified file.

17. The method of claim 16, further comprising:
retrieving the file from the CSP in encrypted form; and
decrypting the file using a key identification stored in a file header.

18. The method of claim 16, wherein tokenizing the file includes at least one of: employing a one-time pad technique, creating a tokenization seed and a stream of token values, or replacing the raw data component with the stream of token values.

19. The method of claim 16, wherein the modified, tokenized file received from the CEP includes one or more modifications to the raw data component, and wherein de-tokenizing the file includes using the tokenization seed to de-tokenize the modified raw data component.

* * * * *